United States Patent
Lee et al.

(10) Patent No.: US 10,898,972 B2
(45) Date of Patent: Jan. 26, 2021

(54) LASER CRYSTALLIZING APPARATUS (71) Applicant: SAMSUNG DISPLAY CO., LTD., Yongin-si (KR)

(72) Inventors: Chung Hwan Lee, Seoul (KR); Hong Ro Lee, Seongnam-si (KR); Rae Chul Park, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 657 days.

(21) Appl. No.: 15/168,325

(22) Filed: May 31, 2016

(65) Prior Publication Data
US 2017/0120375 A1 May 4, 2017

(30) Foreign Application Priority Data
Nov. 3, 2015 (KR) .................. 10-2015-0154012

(51) Int. Cl.
*B23K 26/354* (2014.01)
*B23K 37/04* (2006.01)

(52) U.S. Cl.
CPC ........ B23K 26/354 (2015.10); B23K 37/0408 (2013.01)

(58) Field of Classification Search
CPC ......... H01L 21/67115; H01L 21/02678; H01L 3/0085
USPC ..... 219/121.68, 121.69, 121.84; 355/72, 75; 451/141, 388
See application file for complete search history.

(56) References Cited

U.S. PATENT DOCUMENTS

| | | | | |
|---|---|---|---|---|
| 5,997,963 A | * | 12/1999 | Davison | ................. C23C 16/44 118/722 |
| 6,710,857 B2 | * | 3/2004 | Kondo | .................... G03F 7/707 355/72 |
| 7,553,715 B2 | | 6/2009 | You | |
| 7,837,822 B2 | | 11/2010 | Chin et al. | |
| 7,889,323 B2 | * | 2/2011 | Sung | ...................... G03F 7/707 355/72 |
| 9,921,490 B2 | * | 3/2018 | Shibazaki | ......... H01L 21/68742 |
| 2011/0062641 A1 | | 3/2011 | Sato et al. | |

FOREIGN PATENT DOCUMENTS

| | | |
|---|---|---|
| CN | 1716529 | 1/2006 |
| CN | 1789006 | 6/2006 |
| CN | 101196693 | 6/2008 |
| CN | 102057477 | 5/2011 |

(Continued)

OTHER PUBLICATIONS

Machine Transaltion of KR20070028693; Translated Dec. 2018.*
Chinese Office Action dated Mar. 27, 2020, issued in corresponding Chinese Patent Application No. 201610920465.8.

*Primary Examiner* — Tu B Hoang
*Assistant Examiner* — Thomas J Ward
(74) *Attorney, Agent, or Firm* — F. Chau & Associates, LLC (57) ABSTRACT

A laser crystallizing apparatus includes a stage configured to receive a substrate, the stage including a plurality of groove lines each having a predetermined depth and width, and a plurality of control holes, each arranged in a respective groove line. Each control hole is provided with a negative pressure to hold the substrate to a surface of the stage or a positive pressure to release the substrate from the surface of the stage.

10 Claims, 5 Drawing Sheets

(56) References Cited

FOREIGN PATENT DOCUMENTS

| CN | 201868407 | | 6/2011 | |
|---|---|---|---|---|
| CN | 202428307 | | 9/2012 | |
| JP | 2013-207104 | | 10/2013 | |
| KR | 1020030025678 | | 3/2003 | |
| KR | 20070028693 | * | 3/2007 | ........... H01L 29/786 |
| KR | 1020140065376 | | 5/2014 | |
| KR | 1020150083420 | | 7/2015 | |

* cited by examiner

LASER CRYSTALLIZING APPARATUS

CROSS REFERENCE TO RELATED APPLICATION

This application claims priority under 35 U.S.C. § 119 to Korean Patent Application No. 10-2015-0154012, filed in the Korean Intellectual Property Office on Nov. 3, 2015, the disclosure of which is incorporated by reference herein in its entirety.

Technical Field

Exemplary embodiments of the present invention relate to a laser crystallizing apparatus that crystallizes an amorphous silicon thin film into a polycrystalline silicon thin film using an excimer laser.

Discussion of the Related Art

A laser crystallizing apparatus may include a laser generator generating a laser beam, an optical system including a plurality of lenses and mirrors that equalize the laser beam, and a chamber, which is a space where a substrate is crystallized by the equalized laser beam.

When a substrate that is to be crystallized is loaded onto a stage provided in the chamber, air may be trapped between the substrate and the stage or the substrate may not be properly loaded due to a surface resistance of the stage. Thus, when the substrate is loaded onto the stage, a vacuum hole may be provided to stabilize the loading and to remove the trapped air. In addition, a purge hole may be provided to separate the substrate from the stage when the substrate is unloaded.

However, as the thickness of the substrate decreases, the vacuum hole or the purge hole may mark the substrate. Due to the hole mark on the substrate, a laser may lose focus on the substrate during the laser crystallization process such that grains may not be normally grown.

SUMMARY

According to an exemplary embodiment of the present invention, a laser crystallizing apparatus includes a stage configured to receive a substrate. The stage includes a plurality of groove lines each having a predetermined depth and width, and a plurality of control holes, each arranged in a respective groove line. Each control hole is provided with a negative pressure to hold the substrate to a surface of the stage or a positive pressure to release the substrate from the surface of the stage.

In an exemplary embodiment of the present invention, the control hole comprises a vacuum hole providing the negative pressure.

In an exemplary embodiment of the present invention, the control hole comprises a purge hole providing the positive pressure.

In an exemplary embodiment of the present invention, the control hole is connected to a vacuum line applying the negative pressure to the substrate and a purge line applying the positive pressure to the substrate.

In an exemplary embodiment of the present invention, the laser crystallization apparatus further includes a buffer tank connected to the vacuum line and the purge line.

In an exemplary embodiment of the present invention, the control holes are arranged in a plurality of areas in the stage, and each control hole of the plurality of areas is independently applied with a negative pressure or a positive pressure.

In an exemplary embodiment of the present invention, the depth of the groove line is about 0.1 mm to about 3 mm.

In an exemplary embodiment of the present invention, the width of the groove line is about 0.1 mm to about 5 mm.

In an exemplary embodiment of the present invention, the control hole is applied with a pressure of about −0.01 kPa to about −100 kPa.

In an exemplary embodiment of the present invention, the plurality of groove lines cross each other.

According to an exemplary embodiment of the present invention, a laser crystallizing apparatus includes a laser generator generating a laser beam, an optical system including a plurality of lenses and mirrors, and light-converting the laser beam, and a chamber configured to receive a stage including a plurality of groove lines, each having a predetermined depth and width, and a control hole arranged in each groove line. The stage is configured to receive a substrate and the control hole is provided with a negative pressure to hold the substrate to a surface of the stage or a positive pressure to release the substrate from the surface of the stage.

In an exemplary embodiment of the present invention, the chamber is configured to permit the substrate to be irradiated with the laser beam and crystallize.

According to an exemplary embodiment of the present invention, a laser crystallizing apparatus includes a stage. A surface of the stage includes a first groove line. A first control hole is connected to the first groove line. The first control hole is configured to suction the substrate to the surface of the stage or to release the substrate from the surface of the stage.

In an exemplary embodiment of the present invention, a width of the first control hole is smaller than a width of the first groove line.

In an exemplary embodiment of the present invention, a cross-section of the first groove line has a quadrangular shape or a semi-circular shape.

In an exemplary embodiment of the present invention, the laser crystallizing apparatus further includes a second control hole connected to the first groove line. The second control hole is configured to suction the substrate to the surface of the stage or to release the substrate from the surface of the stage.

In an exemplary embodiment of the present invention, the first control hole is applied with a first pressure, and the second control hole is applied with a second pressure that is different from the first pressure.

In an exemplary embodiment of the present invention, the first and second control holes are applied with a same pressure.

In an exemplary embodiment of the present invention, the surface of the stage further includes a second groove line adjacent to the first groove line. A second control hole is connected to the second groove line. The second control hole is configured to suction the substrate to the surface of the stage or to release the substrate from the surface of the stage.

In an exemplary embodiment of the present invention, the first control hole is connected to a vacuum line and a purge line. The vacuum line is configured to generate negative pressure to suction the substrate to the surface of the stage and the purge line is configured to generate a positive pressure to release the substrate from the surface of the stage.

DETAILED DESCRIPTION OF THE EMBODIMENTS

The present invention will be described more fully hereinafter with reference to the accompanying drawings, in which exemplary embodiments thereof are shown. As those skilled in the art would realize, the described embodiments may be modified in various different ways without departing from the spirit and scope of the present invention.

Like reference numerals may refer to like elements throughout the specification. A repetitive description of elements already described may be omitted for brevity.

The drawings may not illustrate exact dimensions of elements. The relative proportions and ratios of elements in the drawings may be exaggerated or diminished in size for the sake of clarity and convenience. Exemplary embodiments of the present invention are not limited to the sizes and proportions shown in the drawings. When one part is described to be "over" or "on" another part, the one part may be directly over or on the other part or intervening parts may be disposed therebetween.

The elements illustrated in the drawings may include modifications resulting from manufacturing. Exemplary embodiments of the present invention may include these modifications.

Hereinafter, a laser crystallizing apparatus according to an exemplary embodiment of the present invention will be described with reference to FIG. 1 and FIG. 2.

Figure 1:
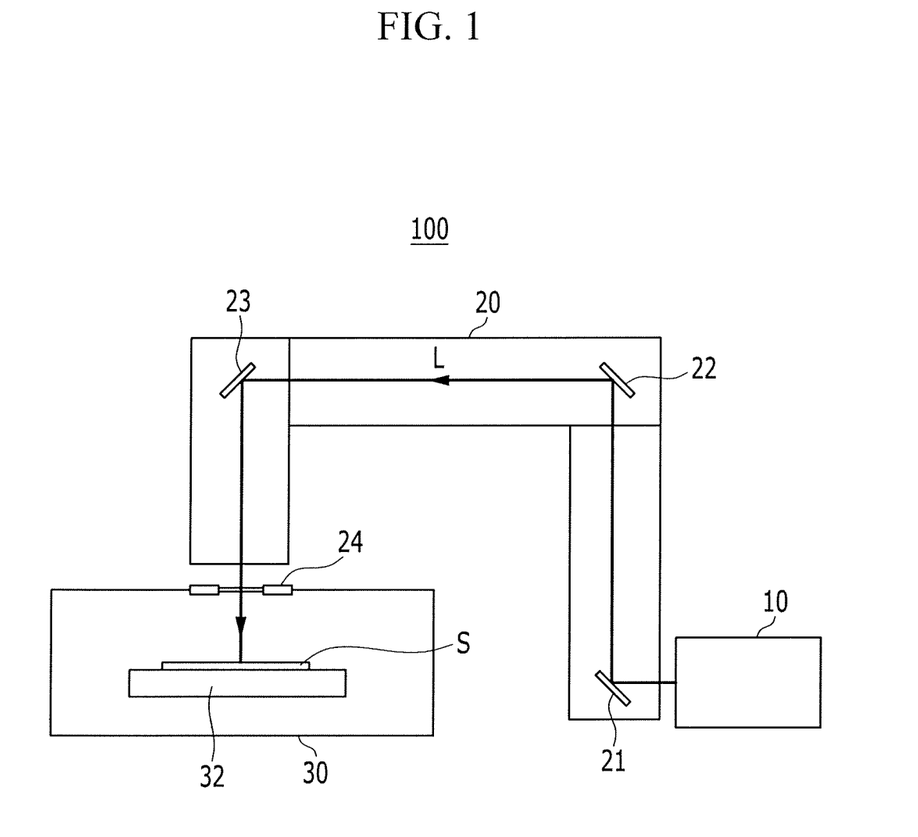
FIG. 1 shows a laser crystallizing apparatus according to an exemplary embodiment of the present invention.
Figure 2:
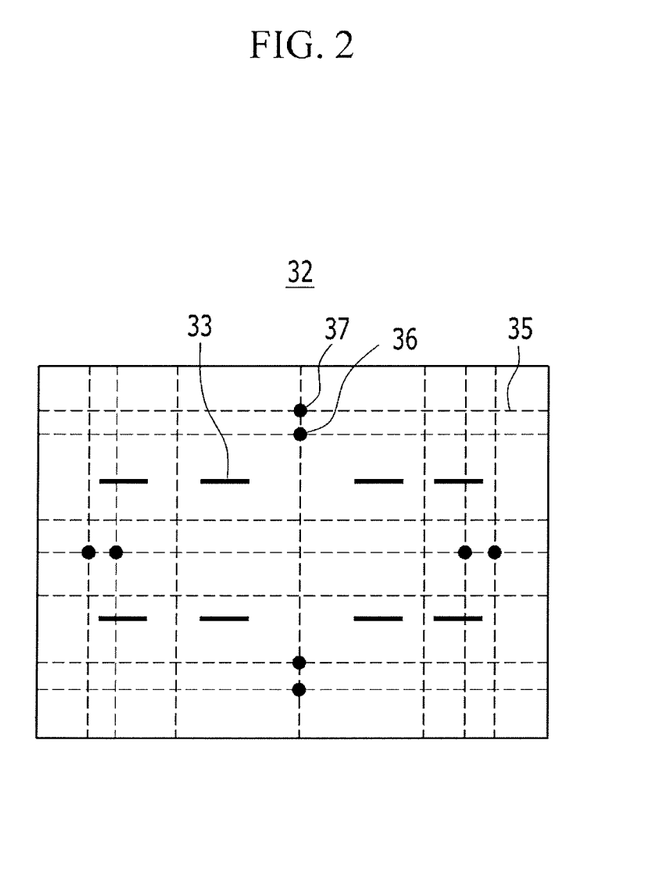
FIG. 2 is a top plan view of a stage according to an exemplary embodiment of the present invention.

FIG. 1 shows a laser crystallizing apparatus according to an exemplary embodiment of the present invention, and FIG. 2 is a top plan view of a stage according to an exemplary embodiment of the present invention.

Referring to FIG. 1, a laser crystallizing apparatus 100 according to an exemplary embodiment of the present invention includes a laser generator 10 for generating a laser beam L, an optical system 20 for generating a light-converted laser beam L by light-converting the laser beam L, and a chamber 30 including a stage 32 where a substrate S is installed. In the substrate S, a thin film is formed and the thin film is laser-crystallized by irradiation of the converted laser beam L. In other words, when the thin film is irradiated by the converted laser beam L, the thin film becomes crystallized.

The laser beam L generated by the laser generator 10 may include P-polarized light and S-polarized light. In addition, as an excimer laser beam inducing a phase transition of the thin film, the laser beam L is light-converted in the optical system 20 and crystallizes the thin film formed on the surface of the substrate S. The thin film may be an amorphous silicon layer, and may be formed using a method such as a plasma enhanced chemical vapor deposition (PECVD) method, a sputtering method, a vacuum evaporation method, and the like. Further, the laser beam L may include a plurality of parallel laser lines. In other words, the laser beam L may include one laser line or a plurality of parallel laser lines.

The optical system 20 includes a plurality of lenses and mirrors 21, 22, and 23 that change a path of the laser beam, and light-converts the laser beam L. The optical system 20 may include at least one half wave plate (HWP) that converts a polarization axis direction of the laser beam L as generated from the laser generator 10, and may include at least one of mirrors 21, 22, and 23 that wholly reflect the laser beam L. Further, the optical system 20 may include at least one polarization beam splitter (PBS) that partially reflects and partially transmits the laser beam L.

The chamber 30 may have a different atmosphere of nitrogen $N_2$, air, and a mixture gas depending on a characteristic of a process, a purpose of a user, and the like. The chamber 30 may have a different pressure depending on whether the chamber 30 experiences decompression, pressurization, or is in a vacuum state. In other words, the chamber 30 may be a closed type chamber that can be isolated from external.

The laser beam L may include a plurality of line beams that are parallel to each other, and the line beams converge into one spot in a beam cutter 24 while passing through a P lens. The P lens reduces a shortened beam size of the laser beam L such that the line beams can be pre-focused. The pre-focused line beams continue traveling forward, thereby forming a final focus on a particular location of the substrate S. An optimal final focus is an area where an overlap of the line beams is minimized. At the optimal final focus area, the line beams have optimal energy density such that the amorphous silicon thin film can be crystallized into a polysilicon thin film with maximum efficiency.

The chamber 30 includes the stage 32 on which the substrate S is installed. The converted laser beam L is irradiated on the thin film disposed on the substrate S. When the thin film is irradiated by the converted laser beam L, the thin film is crystallized. Referring to FIG. 2, the stage 32 includes a plurality of groove lines 35 that extend across the surface of the stage 32. Each of the groove lines 35 has a predetermined depth and a predetermined width. A loading bar 33 where the substrate S is supported when the substrate S is loaded on the stage 32 is provided on the surface of the stage 32.

Control holes 36 and 37 are provided on the groove lines 35 to pull the substrate S to the surface of the stage 32 by receiving a negative pressure or release the substrate S from the surface of the stage 32 by receiving a positive pressure. The control holes 36 and 37 may include vacuum holes 36 to which the negative pressure is applied and purge holes 37 to which the positive pressure is applied. Each of the vacuum holes 36 may be provided with a vacuum line through which the negative pressure is applied to the substrate S. Each of the purge holes 37 may be provided with a purge line for applying a positive pressure to the substrate S. The vacuum lines and the purge lines are respectively provided with pressure control means such that the negative pressure and the positive pressure can be provided when the substrate S is loaded and/or unloaded.

Each of the groove lines 35 may have a predetermined depth and width, and may be formed in a quadrangular shape in a cross-sectional view. For example, portions of the groove lines 35 may extend in a straight line on the stage 32. Further, each of the groove lines 35 may be formed in a semi-circular shape in a cross-sectional view. In addition, the shape of the cross-section of the groove lines 35 may vary and is not limited to the quadrangular or semi-circular shapes. The groove lines 35 may be provided with vacuum holes 36 and purge holes 37, which are respectively separated by a predetermined gap from each other. The groove lines 35 may include a first groove line 35 and a second groove line 35 substantially parallel to each other, and a third groove line 35 crossing the first and/or second groove line 35.

Figure 3:
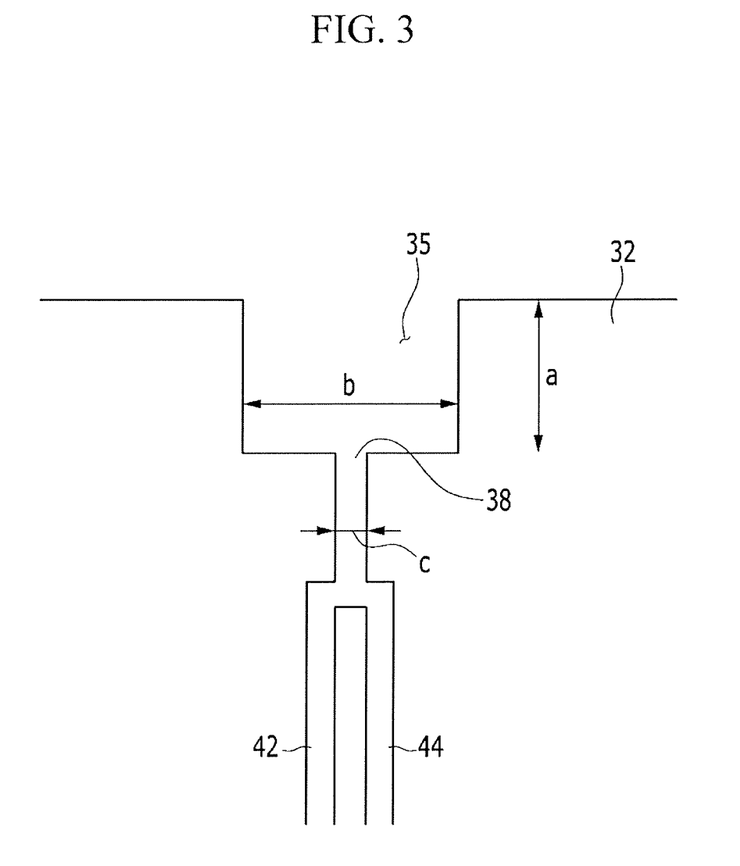
FIG. 3 is a cross-sectional view of a stage according to an exemplary embodiment of the present invention.

FIG. 3 is a cross-sectional view of a stage according to an exemplary embodiment of the present invention.

Referring to FIG. 3, a control hole 38 may be provided as a single hole that provides the functions of a vacuum hole 36 and a purge hole 37. A negative pressure or a positive pressure may be supplied through the control hole 38. The control hole 38 is simultaneously connected to a vacuum line 42 and a purge line 44. The control hole 38 provides the negative pressure through the vacuum line 42 to suction the substrate S to the surface of the stage 32 and provides the positive pressure through the purge line 44 to release the substrate S from the stage 32. The vacuum line 42 and the purge line 44 may be provided with pressure control means, such as a pump and the like, to provide the negative pressure and the positive pressure.

Since a single control hole 38 that provides the functions of both the vacuum hole 36 and the purge hole 37 is provided, the number of holes provided on the surface of the stage 32 can be reduced, and accordingly, generation of marks on the substrate S due to the holes can be reduced.

According to an exemplary embodiment of the present invention, a depth a of a groove line 35 may be equal to or greater than about 0.1 mm. For example, a depth "a" of a groove line 35 may be about 0.1 mm to about 3 mm. According to an exemplary embodiment of the present invention, a width "b" of the groove line 35 may be about 0.1 mm to about 10 mm. For example, the width "b" of a groove line 35 may be about 0.1 mm to about 5 mm. According to an exemplary embodiment of the present invention, a width "c" of the control hole 38 may be smaller than the width "b" of the groove line 35.

A pressure of about –0.01 kPa to about –100 kPa may be applied to the control hole 38, and the pressure (e.g., a negative pressure and a positive pressure) applied to the control hole 38 may be changed in accordance with the size, thickness, and the like, of the substrate S.

Figure 4:
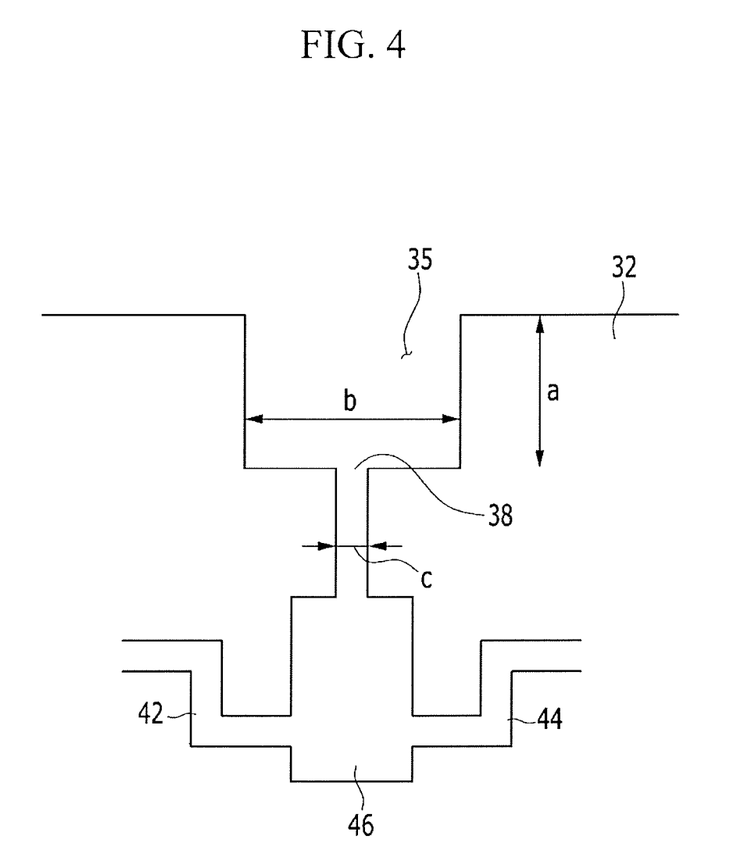
FIG. 4 is a cross-sectional view of a stage according to an exemplary embodiment of the present invention.

FIG. 4 is a cross-sectional view of a stage according to an exemplary embodiment of the present invention.

Referring to FIG. 4, a laser crystallizing apparatus may further include a buffer tank 46 connected to a control hole 38. For example, the buffer tank 46 may include a chamber. For example, the buffer tank 46 is connected to the control hole 38, one side of the buffer tank 46 is connected to a vacuum line 42, and another side of the buffer tank 46 is connected to a purge line 44. When a pressure of a groove line 35 is changed to a positive pressure from a negative pressure or to a negative pressure from a positive pressure through the control hole 38, instantaneous pressure is applied to a portion of the substrate S corresponding to the groove line 35. This occurs due to an instantaneous residual pressure of the control hole 38. Such an instantaneous pressure may cause a hole mark in the substrate S. The buffer tank 46 connected to the control hole 38 is provided to remove the residual pressure and to maintain a balance of the negative pressure and the positive pressure. Thus, the buffer tank 46 prevent the generation of hole marks on the substrate S.

Figure 5:
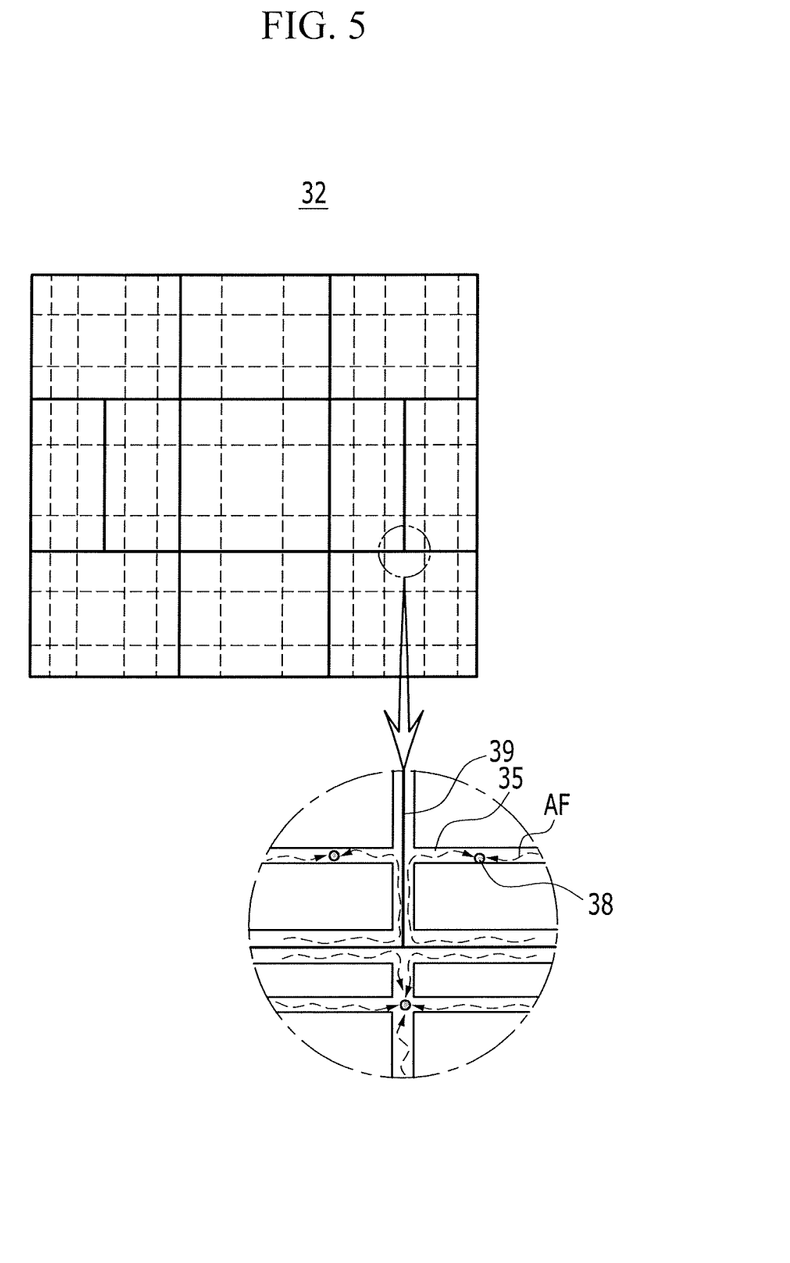
FIG. 5 is a top plan view of a stage according to an exemplary embodiment of the present invention.

FIG. 5 is a top plan view of a stage according to an exemplary embodiment of the present invention.

Referring to FIG. 5, a stage 32 may be partitioned into a plurality of areas by partition lines 39, and a plurality of groove lines 35, each having a predetermined depth and width and crossing each other. As a substrate S is increased in size, an air trapping deviation between the substrate S and the stage 32 increases depending on parts of the substrate S. In addition, when a stress is applied to a flexible substrate S, an edge portion or a center portion of the flexible substrate S may be lifted. Thus, a negative pressure or a positive pressure may be formed by the control holes 38 provided in a bent part of the flexible substrate S to flatten the bent parts of the flexible substrate S. Accordingly, the flexible substrate S may be entirely flattened.

The plurality of areas of the stage 32 may include at least two areas, and the number of areas of the stage 32 can be variously modified. The partition lines 39 that partition the stage 32 into the plurality of areas may be imaginary lines. A plurality of control holes 38 provided in each area may be controlled to independently apply a negative pressure or a positive pressure for each area. Thus, an air flow AF trapped between the substrate S and the stage 32 in each area can flow to the outside through the control holes 38 provided in each area. In other words, a first control hole 38 located in a first area of the stage 32 may be applied with a different pressure than a second control hole 38 located in a second area of the stage 32. For example, the first control hole 38 may be applied with a negative pressure and the second control hole 38 may be applied with a positive pressure. In an exemplary embodiment of the present invention, the first and second control holes 38 may be applied with the same pressure.

As described, according to an exemplary embodiment of the present invention, bending of the substrate S due to air trapping when loading and fastening the substrate S on the stage 32 can be prevented, and generation of marks of holes on the substrate S can be prevented.

Accordingly, processing time and an additional device for reducing the bending of the substrate S are not required, thereby increasing an operation rate.

Further, according to an exemplary embodiment of the inventive concept, the light-converted laser beam L can be prevented from being out of focus during a laser crystallization process since the substrate S is more flattened on the stage 32. Accordingly, uniformity in crystallization of the thin film disposed on the substrate S can be increased and occurrence of low crystallinity due to the light-converted laser beam L from being out of focus can be prevented.

According to an exemplary embodiment of the present invention, bending of the substrate due to air trapping during loading of the substrate to the stage is prevented, and the substrate can be prevented from being hole-marked.

Accordingly, processing time and an additional device for flattening the bending of the substrate may not be required. As a result, an operation rate may be increased.

Further, since a laser can be prevented from becoming out of focus during a laser crystallization process, uniformity in crystallization can be increased and the occurrence of low crystallinity due to the laser being out of focus can be prevented.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:
1. A laser crystallizing apparatus comprising:
   a stage;
   a first groove line disposed on-a surface of the stage;
   a first control hole disposed in the first groove line;
   a second control hole disposed in the first groove line;

a first vacuum line and a first purge line connected to the first control hole; and a second vacuum line and a second purge line connected to the second control hole;

wherein the first control hole is configured to suction the substrate to the surface of the stage or to release the substrate from the surface of the stage, and wherein the first vacuum line is spaced apart from the second vacuum line and the first purge line is spaced apart from the second purge line.

2. The laser crystallizing apparatus of claim 1, wherein a width of the first control hole is smaller than a width of the first groove line.

3. The laser crystallizing apparatus of claim 1, wherein a cross-section section of the first groove line has a quadrangular shape or a semi-circular shape.

4. The laser crystallizing apparatus of claim 1, wherein the first control hole is applied with a first pressure, and the second control hole is applied with a second pressure that is different from the first pressure.

5. The laser crystallizing apparatus of claim 1, wherein the first and second control holes are applied with a same pressure.

6. The laser crystallizing apparatus of claim 1, wherein the surface of the stage further includes a second groove line adjacent to the first groove line, wherein a third control hole is disposed in the second groove line, wherein the third control hole is configured to suction the substrate to the surface of the stage or to release the substrate from the surface of the stage.

7. The laser crystallizing apparatus of claim 6, wherein the first control hole is disposed in a first area in the stage, the third control hole is disposed in a second area in the stage, and the first control hole and the third control hole are independently applied with a negative pressure or a positive pressure.

8. The laser crystallizing apparatus of claim 1, further comprising a buffer tank connected to the first vacuum line and the first purge line.

9. The laser crystallizing apparatus of claim 1, wherein the first purge line and the first vacuum line connected to the first control hole are not shared by the second control hole.

10. The laser crystallizing apparatus of claim 1, wherein the first control hole is applied with a pressure of $-0.01$ kPa to $-100$ kPa.

* * * * *